United States Patent [19]

Lindner et al.

[11] 4,302,378

[45] Nov. 24, 1981

[54] ABS-MOULDING COMPOSITIONS HAVING HIGH NOTCHED IMPACT STRENGTH

[75] Inventors: Christian Lindner, Cologne; Karl-Heinz Ott, Leverkusen; Bernhard Arnold, Pulheim; Friedrich Kowitz; Dieter Kuhlmann, both of Dormagen, all of Fed. Rep. of Germany

[73] Assignee: Bayer Aktiengesellschaft, Fed. Rep. of Germany

[21] Appl. No.: 136,561

[22] Filed: Apr. 2, 1980

Related U.S. Application Data

[63] Continuation-in-part of Ser. No. 69,616, Aug. 27, 1979, abandoned.

[30] Foreign Application Priority Data

Aug. 30, 1978 [DE] Fed. Rep. of Germany ....... 2837735

[51] Int. Cl.³ .......................... C08K 5/10; C08L 51/00

[52] U.S. Cl. .............................. 260/31.6; 260/32.6 A; 525/3; 525/5; 525/6; 525/74; 525/80; 525/83; 525/84

[58] Field of Search .................. 260/31.6, 32.6 A; 525/3, 5, 6, 74, 80, 83, 84

[56] References Cited

U.S. PATENT DOCUMENTS

| | | | |
|---|---|---|---|
| 3,267,175 | 8/1966 | Grabowski | 260/32.6 A |
| 3,284,355 | 11/1966 | Papayannopoulos | 252/58 |
| 3,423,347 | 1/1969 | Zawadzki et al. | 260/31.6 |
| 3,442,979 | 5/1969 | Ott et al. | 525/316 |
| 4,015,057 | 3/1977 | Gall | 525/83 |

*Primary Examiner*—J. Ziegler
*Attorney, Agent, or Firm*—Connolly and Hutz

[57] ABSTRACT

ABS-moulding compositions of (a) 5 to 70% by weight of one or more graft products and (b) 95 to 30% by weight of one or more thermoplastic resins with a content of 0.05 to 1% by weight (based on total moulding composition) of a perfluoroalkane acid or a derivative thereof to improve notched impact strength.

2 Claims, No Drawings

ABS-MOULDING COMPOSITIONS HAVING HIGH NOTCHED IMPACT STRENGTH

This is a continuation-in-part application of U.S. Ser. No. 69,616, filed Aug. 27, 1979, now abandoned.

In addition to the actual polymerisation step, the production of ABS-moulding compositions involves a compounding step in which the graft rubber and the SAN-copolymer are intensively mixed and additives required for further processing and for practical application, such as lubricants, pigments and antistatic agents, are incorporated.

Compounding is generally carried out in internal kneaders or in twin-screw or four-screw kneaders to which a two-roll stand with a band granulator or a strand or underwater granulator is connected. The type of apparatus used depends on the process by which the ABS composition has been produced. Where the SAN copolymer is in the form of a solution polymer, it is preferred to use screw-kneaders. Where polymerisation is carried out in emulsion, the resulting powder is often further processed in an internal kneader.

In general, about 1 to 3% by weight of a lubricant is added to the moulding compositions as a processing aid to improve their flow behaviour and to reduce internal stresses in the moulding produced from the compositions.

Lubricants suitable for ABS moulding compositions are inter alia alkali and alkaline-earth salts of fatty acids, fatty acid esters of monohydric and polyhydric alcohols and amides of long-chain fatty acids and sulphonic acids.

The present invention is based on the discovery that the addition of small quantities of perfluoroalkane acids and their derivatives improves impact strength, particularly the notched impact strength, above all at low temperatures.

In the context of the invention, ABS moulding compositions are in particular mixtures of (a) 5 to 70% by weight of one or more graft products, and (b) 95 to 30% by weight of one or more thermoplastic resins.

The graft products (a) are preferably polymers obtained by polymerising graft monomers in the presence of a rubber as the graft base. The proportion of rubber is from 5 to 80% by weight and is determined by the particular polymerisation process used.

The graft bases used are, in particular, polybutadiene, butadiene/acrylonitrile and butadiene/styrene polymers and also butadiene/styrene block polymers. It is also possible to use acrylic ester/vinyl ether copolymers and EPDM terpolymers. Graft monomers are primarily styrene, mixtures of styrene and acrylonitrile, preferably in a ratio by weight of from 90:10 to 50:50, mixtures of styrene and methyl methacrylate, preferably in a ratio by weight of from 5:95 to 95:5, and mixtures of styrene, acrylonitrile and methyl methacrylate. The production of the graft products is known.

The graft monomers may be emulsion-polymerised in the presence of a latex of the graft base using radical initiators. Where the graft base is pre-crosslinked and providing certain graft monomer/graft base ratios are maintained, the particle size of the latex of the graft base also determines the particle size of the graft polymer. The graft shell, which consists of chains of the polymer of the graft monomers chemically attached to the rubber particles, is relatively thin and does not significantly alter the diameter of the rubber particle. In the context of the invention, "diameter" or "particle size" is understood to be the mean diameter $d_{50}$, i.e. the diameter above which and below which, respectively, the diameters of 50% by wt. of the particles lie. The graft reaction is incomplete. In addition to the actual graft polymer, the ungrafted copolymer of the graft monomers is also formed. For this reason, the product of the graft reaction is referred to as the "graft product".

Graft products may also be produced by bulk-solution or bulk-suspension polymerisation where a monomer-soluble rubber is used as the starting material. In this case, the size of the graft rubber particles is determined by the phase inversion and may be varied both mechanically by stirring and also by chemically influencing the phase equilibrium (addition of dispersants). In general, particles of at least $1\mu$ in size are obtained in this way. The graft product contains a maximum of about 25% by weight of rubber.

According to the invention, it is possible to use graft products of which the particles have a diameter of from 0.05 to $20\mu$, a considerable proportion of the graft monomers being included within the rubber particle in the form of homopolymer or copolymer. Particle diameters of from 0.05 to $1.2\mu$ and from 0.05 to $0.6\mu$ are preferred. It is also possible to use several different graft products together, for example two graft products which differ from one another in their degree of grafting or their graft density, in the size of the rubber particles and/or in the graft density. A particularly suitable graft product is, for example, a mixture of a graft product of rubber particles having a $d_{50}$-value of from 0.35 to $10\mu$ and a graft product of rubber particles having a mean particle diameter $d_{50}$ of from 0.05 to $0.32\mu$, i.e. so-called bimodal systems.

The graft products preferably contain from 35 to 80% by weight (more particularly from 40 to 70% by weight) of rubber, have a mean particle diameter of from 0.1 to $0.5\mu$ and are used in such a quantity that the moulding composition contains from 5 to 25% by wight and preferably from 5 to 20% by weight of rubber (graft base).

The thermoplastic resin forming the second constituent (b) of the ABS moulding compositions forms the continuous phase (matrix) and, generally, is a polymer or copolymer of styrene, α-methyl styrene, acrylonitrile, methyl methacrylate, and maleic acid anhydride. It is preferred to use polystyrene, styrene-acrylonitrile copolymers having an acrylonitrile content of from 20 to 35% by weight, and α-methyl styrene/acrylonitrile copolymers having an acrylonitrile content of from 20 to 31% by weight. Also preferred is polymethylmethacrylate and terpolymers of styrene, acrylonitrile and maleic acid anhydride (preferred composition: 100 parts by weight of resin contain 10 to 25 parts by weight of maleic acid anhydride, 5 to 20 parts by weight of acrylonitrile, remainder styrene). These resins have a molecular weight (weight average) of from 50,000 to 550,000. The molecular inconsistency factor, expressed by the value $(M_w/M_n) - 1 = U_n$, amounts to between 1.0 and 3.5.

If only one graft product is used for producing the moulding compositions, it is advantageous for the quantitative compositions of the graft monomers and monomers forming the resin to correspond largely to one another. Where two graft products are used, it is advantageous for the quantitative ratio of the styrene and acrylonitrile fractions of the polymer of the graft shell of the coarser graft component to differ from that of the resin. α-Methyl styrene cannot be used as graft monomer.

The styrene or α-methyl styrene/acrylonitrile compolymers may be produced by known methods, for example, by bulk polymerization, solution polymerization, suspension polymerization, and emulsion polymerization.

The graft product and the thermoplastic resin are frequently produced separately from one another, generally, by emulsion polymerization. If both the graft product and the thermoplastic resin accumulate in the form of a latex, the latices may be mixed and precipitated together.

Fluorine compounds suitable for use in accordance with the invention are perfluoroalkane carboxylic and sulphonic acids and their derivatives which, when added to the ABS moulding compositions in small quantities, improve their notched impact strength without adversely affecting their other physical properties. Suitable derivatives of the perfluoroalkane acids are, for example, alkali metal, alkaline-earth metal and ammonium salts of acids corresponding to the following formulae:

$$CF_3-(CF_2)_n-COOH \qquad (I)$$

$$CF_3-(CF_2)_n-SO_3H \qquad (II)$$

in which n is an integer of from 1 to 20. It is also possible to use esters or amides of these acids, for example corresponding to the formulae:

$$CF_3-(CF_2)_n-COOR \qquad (III)$$

$$CF_3-(CF_2)_n-CONR'R'' \qquad (IV)$$

$$CF_3-(CF_2)_n-SO_3R \qquad (V)$$

$$CF_3-(CF_2)_n-SO_2NR'R'' \qquad (VI)$$

in which R, R' and R'' represent aryl radicals containing from 6 to 12 carbon atoms, alkyl aryl radicals containing from 7 to 20 carbon atoms, straight-chain or branched alkyl radicals containing from 1 to 20 carbon atoms, and alkyl or aryl radicals containing functional organic groups (such as for example carboxylic acid derivatives, halogens, hydroxyl groups or olefinic groups).

Perfluoroalkane acid derivatives are known. The present invention relates to the use of perfluoroalkane acids and their derivatives in quantities of from 0.05 to 1% by weight as additives for improving the notched impact strength of ABS moulding compositions.

The perfluoroalkane acids (or derivatives) may be used on their own or together with from 0.25 to 5 parts by weight, based on 100 parts by weight of the polymer, of the usual lubricants. It is preferred to use the following combinations (per 100 parts by weight of the ABS moulding composition in each case):

0.1 to 1 part by weight of perfluoroalkane acid (derivative)

0.25 to 3 parts by weight of pentaerythritol tetrastearate or 0.1 to 1 part by weight of perfluoroalkane acid (derivative)

0.25 to 2 parts by weight of pentaerythritol tetrastearate 0.5 to 1.5 parts by weight of bis-stearyl amide of ethylene diamine.

Particularly preferred ABS moulding compositions consist of 5 to 50 parts by weight of a graft product of 40 to 80 parts by weight of polybutadiene and 60 to 20 parts by weight of a styrene-acrylonitrile copolymer produced in its presence with a particle diameter $d_{50}$ of from 0.1 to 0.6μ and preferably from 0.25 to 0.5μ, and 95 to 50 parts by weight of a copolymer of 75 to 70% by weight of styrene and 25 to 30% by weight of acrylonitrile, or of 70% by weight of α-methyl styrene and 30% by weight of acrylonitrile, the moulding composition containing no more than 20% by weight of polybutadiene.

Other preferred ABS moulding compositions consist of 6 to 30 parts by weight of a graft product of 20 to 60 parts by weight of a mixture of styrene and acrylonitrile in a ratio by weight of from 88:12 to 60:40 on 80 to 40 parts by weight of a butadiene homopolymer or copolymer having a butadiene content of at least 70% by weight and a mean particle diameter $d_{50}$ of from 0.26 to 0.65μ;

14 to 45 parts by weight of a graft product of 60 to 40 parts by weight of a mixture of styrene and acrylonitrile in a ratio by weight of from 80:20 to 60:40 on 40 to 60 parts by weight of a butadiene homopolymer or copolymer having a butadiene content of at least 70% by weight and a mean particle diameter $d_{50}$ of from 0.08 to 0.25μ; and 25 to 80 parts by weight of a copolymer of styrene and/or α-methyl stryene on the one hand and acrylonitrile on the other hand in a ratio by weight of from 80:20 to 60:40 with an average molecular weight of from 50,000 to 200,000.

The perfluoroalkane acids or derivatives are preferably added to the ABS moulding composition during compounding. If the ABS is produced by bulk-suspension polymerisation, the perfluoroalkane acid or derivative may even be added during polymerisation.

In the quantities indicated above, the perfluoroalkane acids or derivatives increase notched impact strength without adversely affecting other physical properties. The perfluoroalkane acids or derivatives combined with suitable lubricants give ABS moulding compositions having optimal product properties.

EXAMPLES

A. Production and characteristics of the ABS-moulding compositions:

Two methods were used for producing the ABS moulding compositions:

1. The graft rubber latex produced by emulsion polymerisation is mixed in a certain quantitative ratio with one or more SAN copolymer latices produced by emulsion polymerisation. After the addition of an aqueous stabiliser dispersion (containing 0.25 to 1.5 parts by weight of a phenolic antioxidant per 100 parts by weight of polymer), the latex mixture is coagulated by the addition of an electrolyte or acid. The resulting powder is dried at 70° to 80° C. in a vacuum drying cabinet.

2. The graft rubber latex produced by emulsion polymerisation (or even a mixture of several graft rubber latices) is coagulated after the addition of the stabiliser and worked up into a powder. If necessary, SAN-copolymer may be incorporated in the same way as described in B.

The ABS-graft rubbers and SAN-copolymers used are characterised in Tables 1 and 2.

TABLE 1

| | | Graft rubbers | | | | |
|---|---|---|---|---|---|---|
| | | Ratio by weight of styrene to acrylonitrile | Mean particle | | Composition of the graft base[3] | |
| Graft polymer | Ratio by weight of graft base to graft monomer | in the monomer mixture | diameter[1] $d_{50}$ ($\mu$) | G-value[2] | B % by weight | S % by weight |
| P 1 | 50:50 | 70:30 | 0.4 | 0.55 | 100 | — |
| P 2 | 60:40 | 88:12 | 0.4 | 0.45 | 100 | — |
| P 3 | 50:50 | 70:30 | 0.1 | 0.72 | 100 | — |

[1]Ultracentrifuge measurements, cf. W. Schlotan, H. Lange, Kolloidz. and Z. Polymere 250 (1972) 783–796 and G. Kampf, H. Schuster, Angew. Makromol. Chemie 14 (1970)111–129. The particle diameter is always understood to be the $d_{50}$-value.

[2]The degree of grafting G (G-value) designates the ratio $\frac{\text{grafted styrene/acrylonitrile}}{\text{graft base}}$ as a dimensionless figure.

[3]B = butadiene, S = styrene.

TABLE 2

| | Styrene/acrylonitrile and $\alpha$-methyl styrene/acrylonitrile copolymers | | | |
|---|---|---|---|---|
| | Composition of copolymer (% by weight) | | Viscosity[1] $\frac{\eta \text{ spec.}}{C}$ | Molecular inconsistency[2] $U_n$ |
| Copolymer | Styrene Acrylonitrile | $\alpha$-methyl styrene | | |
| S 1 | 74:26 | | 95 | 3.0 |
| S 2 | 70:30 | | 110 | 2.5 |

[1]Viscosity = $\frac{\eta \text{ spec.}}{C}$ with C = 5 g/l in methylethyl ketone at 25° C.

[2]$U_n = \frac{M_w}{M_n} - 1$ $M_w$ = weight average molecular weight
$M_n$ = number average molecular weight.

B. Compounding:

Any known compounding unit may be used for mixing the graft product and the thermoplastic resin and also for incorporating the perfluoroalkane acid or derivative providing it ensures homogeneous mixing at 140° to 260° C. Suitable compounding units are inter alia heatable mixing rolls followed by a granulator, twin-screw and four-screw kneaders followed by a granulator, and also internal mixers and Banbury mixers, followed by a two-roll stand and a granulator.

The compounding unit used for the purposes of the invention was a Banbury mixer of the BR (Pomini-Farrel) type operated under the following conditions:

| melt temperature: | 190–225° C. |
|---|---|
| mixing time: | 1.5–2 minutes |
| cycle time: | 2.0–4 minutes. |

After mixing, the material accumulates in the form of a plastic mass on a two-roll stand (roll 1T=160° C., roll 2T=150° C.) and is run off in the form of a band which is granulated after cooling.

C. Test procedure

Standard small test bars are produced from the granulate by injection moulding at 220° C. These standard small test bars are tested by DIN methods for notched impact strength, impact strength, hardness and thermal stability under load according to Vicat B. Processibility is determined by the flat spiral test according to H. Ebneth, K. Bohm: Fliessfahigkeit von ABS-Polymerisation; Plastverarbeiter 19 (1968) 4, pages 261–269, at a temperature of 220° C.

EXAMPLES 1 to 5, Comparison Example a

A moulding composition of the following constitution is prepared by latex mixing and coagulation:

| graft polymer P 2 | 155 parts by weight |
|---|---|
| graft polymer P 3 | 245 parts by weight |
| resin polymer S 1 | 600 parts by weight. |

The powder is compounded in a B R Banbury mixer in accordance with B, the following additions being made per 100 parts by weight of powder:

| Example No. | Fluorine compound of Table 3, parts by weight |
|---|---|
| a | — |
| 1 | 0.5 |
| 2 | 0.5 |
| 3 | 0.5 |
| 4 | 0.5 |
| 5 | 0.5 |

TABLE 3

| Fluorine compounds used $CF_3\text{-}(CF_2)_n\text{-}X$ | | |
|---|---|---|
| Type | n | X |
| A | 7 | $SO_3K$ |
| B | 6 | $COONH_4$ |
| C | 7 | $COO\frac{Ca}{2}$ |
| D | 6 | $SO_2N(CH_3)(CH_2\text{-}CH_2\text{-}CH_3)$ |
| E | 7 | $SO_2N(CH_2\text{-}CH_2\text{-}CH(CH_3)_2)_2$ |

Testing in accordance with C produced the results set out in Table 4:

TABLE 4

| Example No. | a | 1 | 2 | 3 | 4 | 5 |
|---|---|---|---|---|---|---|
| Notched impact strength | 5.3 | 15.9 | 16.0 | 15.8 | 16.1 | 15.7 |

TABLE 4-continued

| Example No. | a | 1 | 2 | 3 | 4 | 5 |
|---|---|---|---|---|---|---|
| 23° C. kJ/m² | | | | | | |
| Ball indentation hardness 30 s | 88.1 | 87.2 | 88.0 | 87.9 | 87.5 | 88.0 |
| Flow on flat spirals 220° C. | 37 | 37.5 | 37.5 | 37.0 | 37.5 | 37.0 |
| Fluorine compound according to Table 3 | — | A | B | C | D | E |

As can be seen from Table 4, the addition of 0.5 parts by weight of the fluorine compound produces a considerable improvement in notched impact strength.

EXAMPLES 6 TO 10, Comparison Example b

The following additions (parts by weight per 100 parts by weight of ABS-powder) are made in accordance with B to the moulding composition used in Examples 1 to 5.

| Example No. | Fluorine compound according to Table 3 Type | Parts by weight | Ca—stearate parts by weight |
|---|---|---|---|
| b | — | | 0.5 |
| 6 | A | 0.5 | 0.5 |
| 7 | B | 0.5 | 0.5 |
| 8 | C | 0.5 | 0.5 |
| 9 | D | 0.5 | 0.5 |
| 10 | E | 0.5 | 0.5 |

The testing of standard small bars produced from the granulate in accordance with C produces the results set out in Table 5:

TABLE 5

| Example No. | b | 6 | 7 | 8 | 9 | 10 |
|---|---|---|---|---|---|---|
| Fluorine compound (type according to Example 3) | — | A | B | C | D | E |
| Notched impact strength 23° C. kJ/m² | 7.2 | 19.3 | 19.5 | 18.5 | 20.0 | 19.5 |
| Ball indentation hardness 30 s | 93 | 99 | 101 | 100 | 104 | 101 |

EXAMPLES 11 TO 13, Comparison Examples c, d, e, f

A moulding composition of the following constitution is prepared by latex mixing and coagulation:

| graft polymer P 2 | 12.6 parts by weight |
| graft polymer P 3 | 20.0 parts by weight |
| resin polymer S 1 | 67.4 parts by weight |

The following additions are made per 100 parts by weight of the moulding composition in accordance with B:

| Example No. | Fluorine compound Type A, parts by weight | Bis-stearyl-amide of ethylene diamine (parts by weight) | Pentaery-thritol-tetra-stearate (parts by weight) |
|---|---|---|---|
| 11 | 0.5 | 3.0 | — |
| 12 | 0.5 | 2.0 | 1.0 |
| 13 | 0.5 | 1.0 | 2.0 |
| c | — | 3.0 | — |
| d | — | 2.0 | 1.0 |
| e | — | 1.0 | 2.0 |
| f | — | — | 3.0 |

Testing in accordance with C produces the results set out in Table 6:

TABLE 6

| Example No. | 11 | 12 | 13 | c | d | e | f |
|---|---|---|---|---|---|---|---|
| Notched impact strength 23° C. kJ/m² | 11.5 | 13.5 | 14 | 9 | 10 | 12 | 7.5 |
| Ball indentation hardness 30 s | 93 | 91 | 90 | 94 | 93 | 93 | 94 |
| Flow on flat spirals 220° C. | 45 | 45 | 44 | 45 | 45 | 42 | 41 |

As can be seen from Table 6, optimal data are obtained by using a lubricant system consisting of the fluorine compound, pentaerythritol tetrastearate and the bis-stearylamide of ethylene diamine.

EXAMPLES 14 TO 16, Comparison Example g

An ABS moulding composition of the following constitution is prepared by latex mixing and coagulation:

| graft polymer P 1 | 25 parts by weight |
| resin polymer S 2 | 75 parts by weight. |

The following additions (parts by weight per 100 parts of ABS powder) are made in an internal kneader in accordance with B:

| Example No. | Fluorine compound A (parts by weight) | Ca—stearate (parts by weight) |
|---|---|---|
| g | — | 0.5 |
| 14 | 0.1 | 0.5 |
| 15 | 0.25 | 0.5 |
| 16 | 0.5 | 0.5 |

Testing of standard small bars produced from the granulate in accordance with C produces the results set out in Table 7:

TABLE 7

| Example No. | g | 14 | 15 | 16 |
|---|---|---|---|---|
| Notched impact strength 23° C. kJ/m² | 7.2 | 12.8 | 15.5 | 19.3 |
| Ball indentation hardness 30 s | 93 | 93 | 97 | 99 |

We claim:
1. ABS-moulding compositions comprising an ABS-polymer of

(a) 5 to 70% by weight of one or more graft products which have been made by graft polymerising styrene, a mixture of styrene and acrylonitrile, a mixture of styrene and methylmethacrylate or a mixture of styrene, acrylonitrile and methylmethacrylates onto a polybutadiene, butadiene/styrene or butadiene/acrylonitrile rubber, (b) 95 to 30% by weight of one or more thermoplastic resins selected from polystyrene, styrene/acrylonitrile copolymers, α-methylstyrene/acrylonitrile copolymers, polymethylmethacrylate and terpolymers of styrene, acrylonitrile and maleic acid anhydride, and (c) 0.05 to 1% by weight (based on total mixture) of a perfluoroalkane acid of the formula $CF_3$−$(CF_2)_{\overline{n}}$COOH, $CF_3$−$(CF_2)_{\overline{n}}$SO$_3$H (n=1-20), a salt of said acid, an ester or an amide of said acid.

2. ABS-moulding compositions according to claim 1 having an additional content of 0.025 to 3% by weight of pentaerythritol tetrastearate, bis-stearylamide of ethylene diamine or mixtures thereof.

* * * * *